(12) United States Patent
Nakano et al.

(10) Patent No.: US 12,084,044 B2
(45) Date of Patent: Sep. 10, 2024

(54) VEHICLE CONTROL SYSTEM

(71) Applicant: Hitachi Astemo, Ltd., Hitachinaka (JP)

(72) Inventors: Hiroshi Nakano, Tokyo (JP);
Nobuyasu Kanekawa, Tokyo (JP);
Atsushi Arata, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 266 days.

(21) Appl. No.: 17/778,605

(22) PCT Filed: Nov. 6, 2020

(86) PCT No.: PCT/JP2020/041454
§ 371 (c)(1),
(2) Date: May 20, 2022

(87) PCT Pub. No.: WO2021/106518
PCT Pub. Date: Jun. 3, 2021

(65) Prior Publication Data
US 2023/0001912 A1 Jan. 5, 2023

(30) Foreign Application Priority Data
Nov. 27, 2019 (JP) .............................. 2019-213776

(51) Int. Cl.
*B60W 20/50* (2016.01)
*B60L 3/00* (2019.01)
(Continued)

(52) U.S. Cl.
CPC .......... *B60W 20/50* (2013.01); *B60L 3/0061* (2013.01); *B60W 10/02* (2013.01); *B60W 10/08* (2013.01);
(Continued)

(58) Field of Classification Search
CPC ..... B60L 3/0061; B60W 20/10; B60W 20/15; B60W 20/40; B60W 50/029; B60W 2050/0292; B60W 2710/081; B60W 20/50
See application file for complete search history.

(56) References Cited

U.S. PATENT DOCUMENTS

| | | | | |
|---|---|---|---|---|
| 2004/0084234 | A1* | 5/2004 | Yatabe | B60W 20/00 903/910 |
| 2005/0184529 | A1* | 8/2005 | Ueda | B60W 20/00 290/40 C |

(Continued)

FOREIGN PATENT DOCUMENTS

| | | | |
|---|---|---|---|
| CN | 104015600 A | * | 9/2014 |
| JP | 2001320806 A | * | 11/2001 |

(Continued)

OTHER PUBLICATIONS

Mutoh, Nobuyoshi et al., "Driving Characteristics of an Electric Vehicle System With Independently Driven Front and Rear Wheels", IEEE Transactions on Industrial Electronics, vol. 53 No. 3, Jun. 2006, pp. 803 to 813 (Year: 2006).*

(Continued)

*Primary Examiner* — David A Testardi
(74) *Attorney, Agent, or Firm* — Volpe Koenig

(57) ABSTRACT

A vehicle control system includes a first electric motor that causes a vehicle to travel, a second electric motor that generates power by using an output of a power source and starts the power source, a power storage device that stores the power generated by the second electric motor and supplies the power to the first electric motor, a monitoring device that monitors a failure state of the vehicle, and a switch that switches the vehicle to travel from the first electric motor to the second electric motor. In a case of a predetermined driving state in which the monitoring device (Continued)

detects a failure of the first electric motor and a driving force is obtained from the second electric motor, the monitoring device controls the switch to switch the driving force for causing the vehicle to travel from the first electric motor to the second electric motor.

5 Claims, 5 Drawing Sheets

(51) Int. Cl.
  *B60W 10/02* (2006.01)
  *B60W 10/08* (2006.01)
(52) U.S. Cl.
  CPC ............... *B60W 2510/081* (2013.01); *B60W 2520/28* (2013.01)

(56) References Cited

U.S. PATENT DOCUMENTS

| | | | |
|---|---|---|---|
| 2008/0315803 A1 | 12/2008 | Yonemori et al. | |
| 2013/0325239 A1* | 12/2013 | Ozaki | B60T 17/22 701/22 |
| 2014/0062349 A1* | 3/2014 | Isayeva | G05B 9/02 318/139 |
| 2014/0114523 A1* | 4/2014 | Hirasawa | B60L 3/0015 903/930 |
| 2015/0046008 A1* | 2/2015 | Kuwamoto | B60W 50/029 180/65.265 |
| 2015/0148186 A1* | 5/2015 | Uchida | B60K 6/42 477/3 |
| 2015/0375739 A1* | 12/2015 | Ohkubo | B60W 10/06 180/65.23 |
| 2016/0257302 A1* | 9/2016 | Mitsutani | B60W 10/06 |
| 2017/0334437 A1* | 11/2017 | Mikami | B60W 20/50 |
| 2018/0334053 A1* | 11/2018 | Nasu | B60L 15/2036 |
| 2018/0345971 A1* | 12/2018 | Birnschein | B62D 21/11 |
| 2019/0118800 A1* | 4/2019 | Cho | B60W 10/196 |
| 2019/0217853 A1* | 7/2019 | Aiki | B60W 10/08 |
| 2021/0031749 A1* | 2/2021 | Tsukamoto | B60W 10/08 |
| 2021/0171015 A1* | 6/2021 | Artail | B60K 6/445 |

FOREIGN PATENT DOCUMENTS

| | | | | |
|---|---|---|---|---|
| JP | 2006347240 A | * | 12/2006 | |
| JP | 2009-029395 A | | 2/2009 | |
| JP | 2009067091 A | * | 4/2009 | |
| JP | 2012136064 A | * | 7/2012 | |
| JP | 2014184880 A | * | 10/2014 | |
| JP | 2016-007967 A | | 1/2016 | |
| JP | 2016043701 A | * | 4/2016 | |
| JP | 2016082842 A | * | 5/2016 | |
| JP | 2016193685 A | * | 11/2016 | |
| JP | 2016199197 A | * | 12/2016 | ............ B60K 6/442 |
| JP | 2017177969 A | * | 10/2017 | |
| JP | 2017190063 A | * | 10/2017 | |
| JP | 2019-123433 A | | 7/2019 | |
| JP | 2021020566 A | * | 2/2021 | ............... B60K 6/24 |

OTHER PUBLICATIONS

EPO machine translation of JP 2021-20566 A (original JP document published Feb. 18, 2021) (Year: 2021).*
International Search Report, PCT/JP2020/041454, Feb. 22, 2021 (2 pgs).

* cited by examiner

VEHICLE CONTROL SYSTEM

TECHNICAL FIELD

The present invention relates to a vehicle control system for a vehicle that travels by using an electric power generated by an engine.

BACKGROUND ART

As one of requirements for a safety in advanced automatic driving, there is a requirement for a fail operation (operation continuity in failure). This is a function of maintaining a minimum performance by using a remaining function instead of stopping a function when one part of a component fails.

In an automatic driving vehicle, it is required to secure a safety of a system by redundancy of a control system or a sensor system, and to stop a vehicle automatically and safely in the end when continuation of the automatic driving becomes difficult.

A driving control system that realizes automatic driving includes a sensing unit that recognizes a surrounding vehicle, a pedestrian, a traveling path, and the like, a calculation unit that makes a driving plan based on sensed information, and a drive unit that generates a driving force of a vehicle such as an engine and a motor. In order to be able to stop after moving to a safe place even if a failure occurs, a fail operation is required not only for a failure of a sensing unit or a calculation unit but also for a failure of a drive system of a vehicle.

As the drive system of the vehicle, from a viewpoint of increasing an efficiency of an engine by a constant speed operation specialized for power generation and securing a sufficient traveling distance, a drive system of a series hybrid drive system that generates a driving force by using an electric power generated by an engine is widely used. Main components of the drive system are an engine for power generation, a generator, an electric motor, and a storage battery. PTL 1 discloses a drive system of such a hybrid vehicle.

In PTL 1, a motor generator that is driven by an engine to generate an alternating current and also functions as a starter that drives the engine at the time of starting a vehicle, a motor that drives a vehicle, a diode rectifier that rectifies the alternating current generated by the motor generator, a first inverter that is coupled to a power supply path between the diode rectifier and the motor and converts a direct current of the power supply path into an alternating current, a second inverter that is coupled in parallel with the first inverter, a battery that is coupled to the power supply path, and switching means that can alternatively switch between a motor power supply mode in which the second inverter is coupled to a motor and a starter power supply mode in which a battery is coupled to the motor generator via the second inverter are included. As a result, an effective use and a high-efficiency operation of the inverter are achieved.

CITATION LIST

Patent Literature

PTL 1: JP 2009-29395 A

SUMMARY OF INVENTION

Technical Problem

According to the related art, the effective use and the high efficiency of the inverter are enabled, but it is desired to further consider redundancy of the control device and the fail operation.

Therefore, an object of the present invention is to realize a redundant configuration having operation continuity at the time of a failure at a lower cost in a drive system of a hybrid vehicle, and to safely execute switching of a power source.

Solution to Problem

The present invention includes a first electric motor that causes a vehicle to travel, a second electric motor that generates power by using an output of a power source and starts the power source, a power storage device that stores the power generated by the second electric motor and supplies the power to the first electric motor, a monitoring device that monitors a failure state of the vehicle, and a driving force switching device that switches a driving force for causing the vehicle to travel from the first electric motor to the second electric motor. In a case of a predetermined driving state in which the monitoring device detects a failure of the first electric motor and a driving force is obtained from the second electric motor, the monitoring device controls the switching device to switch the driving force for causing the vehicle to travel from the first electric motor to the second electric motor.

Advantageous Effects of Invention

According to the present invention, it is possible to provide a vehicle control system that realizes a low-cost redundant configuration using a second electric motor as a generator as a power source when a first electric motor for traveling fails and secures safety. Other problems, configurations, and effects will be clarified by the following description of embodiments.

DESCRIPTION OF EMBODIMENTS

Hereinafter, examples according to the present invention will be described.

Example 1

Figure 1:
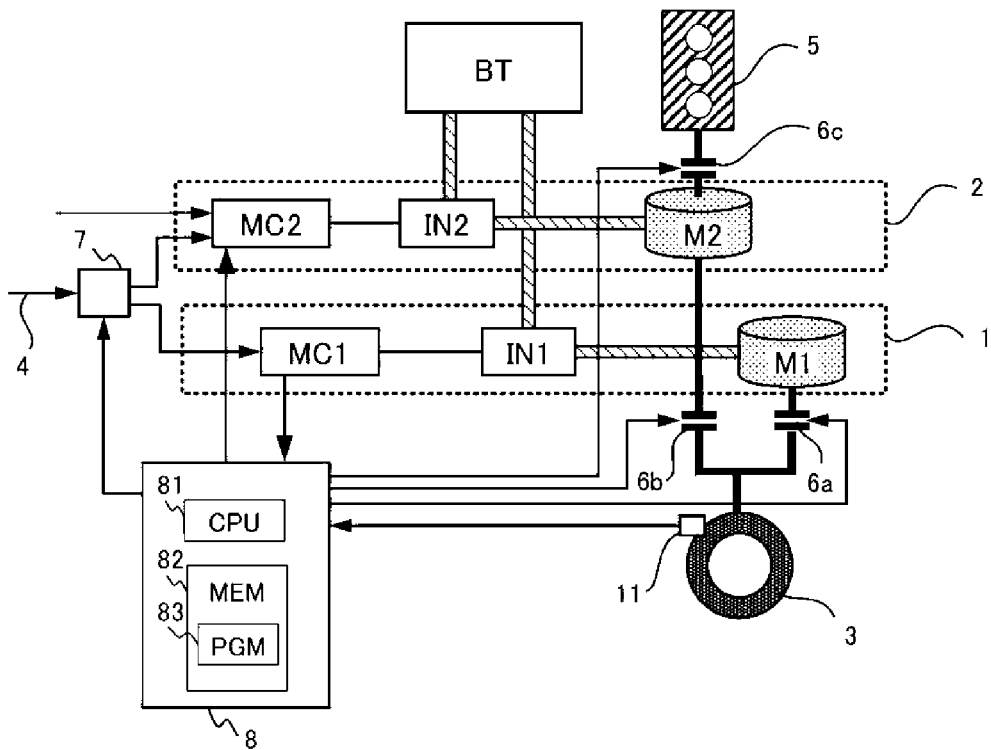
FIG. 1 is a diagram illustrating Example 1 of the present invention and illustrating an example of a hybrid drive system.

Hereinafter, Example 1 according to the present invention will be described. FIG. 1 illustrates an example of a hybrid drive system to which the present invention is applied. The hybrid drive system illustrated in FIG. 1 includes a first drive device 1 including an electric motor M1 that applies a rotational torque to a wheel 3 based on a torque command 4, an inverter IN1 that controls a current applied to the electric motor M1, and a controller MC1 that controls a rotational speed (or torque) of the electric motor M1.

The electric motor M1 also has a function of regenerating energy at the time of deceleration of the vehicle, and the regenerated electric energy is converted into a direct current by the inverter IN1 and stored in a battery BT. When the first drive device operates as a regeneration function, the inverter IN1 and the controller MC1 function as a converter that converts an AC voltage output from the electric motor M1 into a DC voltage and charges the battery BT.

An engine 5 is used for power generation to generate electric energy when the electric motor M1 is in a normal state. A rotational force of the engine 5 is converted into an AC current by an electric motor M2. The AC current generated by the electric motor M2 is converted into a DC current by a controller MC2 and an inverter IN2 to charge the battery BT. Note that the inverter IN2 can function as a converter including a rectifier circuit.

In addition, the electric motor M2 has a function (starter) of generating a starting torque of the engine 5. In this case, the electric motor M2 is included in a second drive device 2 including the inverter IN2 that controls a current applied to the electric motor M2 and the controller MC2 that controls a rotational speed (or torque) of the electric motor M2.

Note that the controller MC1 and the controller MC2 are configured by different ICs and are disposed separately. In addition, the inverter IN1 and the inverter IN2 are configured by different ICs and are disposed separately. Redundancy can be secured by separately disposing circuits of the controllers MC1 and MC2 and the inverters IN1 and IN2.

In order to apply the hybrid drive system as described above to a drive system of an automatic driving vehicle, it is required to provide a hybrid drive system in which a redundancy cost for securing safety is suppressed as much as possible.

Since the number of components is large in the hybrid drive system, it is necessary to reduce the size and cost by narrowing down individual components to the minimum necessary capacity and function. For example, a low-output product having a small power generation capacity can be selected as the electric motor M2. This is because the electric energy stored in the battery BT can be used when necessary electric power temporarily increases, for example, at the time of acceleration.

In addition, it is necessary to suppress the cost by using an existing hybrid drive system for redundancy of the drive system. Since the hybrid drive system includes the first drive device 1 and the second drive device 2, a redundant configuration can be formed as follows by using these drive devices.

When the electric motor M1 fails, the electric motor M1 is disconnected from the wheel 3 by a clutch 6a, a clutch 6b is engaged, and the electric motor M2 is connected to the wheel 3 to continue traveling. The engine 5 is disconnected from the electric motor M2 by a clutch 6c. The torque command 4 switches a destination of the torque command from the controller MC1 to the controller MC2 by a signal switch 7. As will be described later, the clutches 6a to 6c and the signal switch 7 are controlled by a monitoring device 8.

The clutch 6a is for reducing a torque loss caused by the failed electric motor M1. Since the clutch 6b only needs to transmit the driving force from the electric motor M2 having a torque output smaller than that of the electric motor M1, it is possible to select a compact and low-cost product. In addition, the clutch 6c is intended to disconnect the engine 5 and the electric motor M2 in order to reduce a torque loss of the electric motor M2 caused by the engine 5. The clutches 6a to 6c of the present example function as a switching device of a driving force for causing a vehicle to travel.

The clutch 6a and the clutch 6c are intended to reduce the torque loss transmitted to the electric motor M2 by disconnecting the clutch. Even if the engine 5 or the electric motor M1 is coupled to the electric motor M2, these clutches are not necessarily required components as long as the driving force required for the vehicle can be secured.

In the above-described redundant configuration, since the low-output electric motor M2 is used when the electric motor M1 fails, the driving force at the time of a failure is limited. However, it is only necessary to secure the minimum driving force for causing the vehicle to be retracted to a safe place, and a low-cost redundant configuration is obtained.

In order to determine and instruct the above switching, the hybrid drive system includes the monitoring device 8 to which the present invention is applied. The monitoring device 8 is a device that detects a failure of the first drive device 1 and performs control to safely switch to the second drive device 2.

In order to detect the speed (vehicle speed) of the vehicle, a signal of a vehicle speed sensor 11 that detects a vehicle speed from, for example, the rotational speed (rotational speed per unit time) of the wheel 3 is input to the monitoring device 8. The monitoring device 8 is a computer including a CPU 81 and a memory 82. A control program (PGM in the drawing) 83 is loaded into the memory 82 and executed by the CPU 81.

The control program 83 monitors a current of the electric motor M1 to detect a failure, and when the failure is detected, controls the clutches 6a to 6c and the signal switch 7 according to a value of the vehicle speed sensor 11 to switch to traveling by the electric motor M2.

In the present example, an example is described in which the electric motor M1 includes a current sensor, and the control program 83 of the monitoring device 8 acquires a value of the current sensor and detects the failure when the current of the electric motor M1 is cut off (or decreased). However, the present invention is not limited to this example. For example, the electric motor M1 may include a failure detection device (not illustrated) that detects a failure by monitoring a current or a drive state, and the failure detection device may notify the monitoring device 8 of an occurrence of the failure when the failure occurs. Further-more, as the vehicle speed sensor 11, a wheel speed sensor that detects a rotational speed of the wheel, an acceleration sensor, a satellite positioning system, or the like can be adopted.

Figure 2:
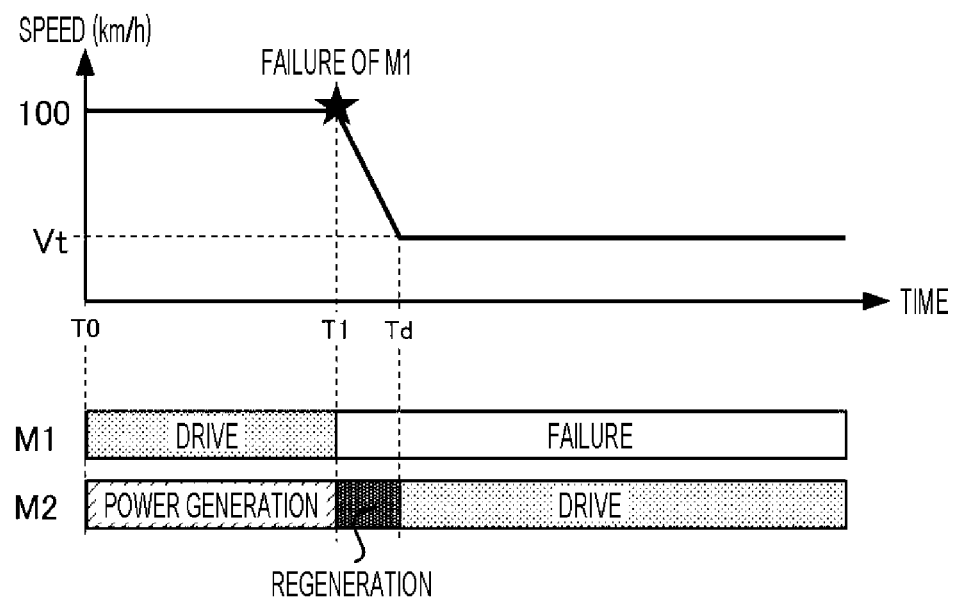
FIG. 2 is a diagram illustrating a case where the present invention is not applied and illustrating a vehicle speed and a state of an electric motor of a hybrid drive system.

A traveling state when the electric motor M1 fails will be described with reference to FIGS. 2 and 3. FIG. 2 is a diagram illustrating a profile of a vehicle speed and a state of an electric motor in a case where the present invention is not applied. As an example, drive states and vehicle speeds of the electric motors M1 and M2 when the electric motor M1 fails while the vehicle is traveling at 100 km/h are illustrated.

When the vehicle is traveling at 100 km/h, the vehicle travels by the driving force of the electric motor M1, and the electric motor M2 is driven by the engine 5 to be in a power generation state. Here, it is assumed that when the electric motor M1 fails, the monitoring device 8 detects the failure, engages the clutch 6b, and connects the electric motor M2 to the wheel 3. In this case, the rotational force of the wheel 3 is applied to the electric motor M2, and the electric motor M2 rotates at a high speed.

When the electric motor M2 rotates by an external force, the electric motor M2 enters a power generation (regeneration) state, and the vehicle speed rapidly decreases due to a resistance of the electric motor M2 in the power generation state.

When the vehicle speed becomes equal to or less than a constant vehicle speed Vt, the driving force of the electric motor M2 is obtained in a range, and the vehicle is in a traveling state at a low speed. Such a rapid decrease in the vehicle speed may cause rear-end collision of a following vehicle or slip of the vehicle. In addition, a load is applied to the clutch 6c having a weak strength due to rapid deceleration by the electric motor M2, which may cause a failure.

Figure 3:
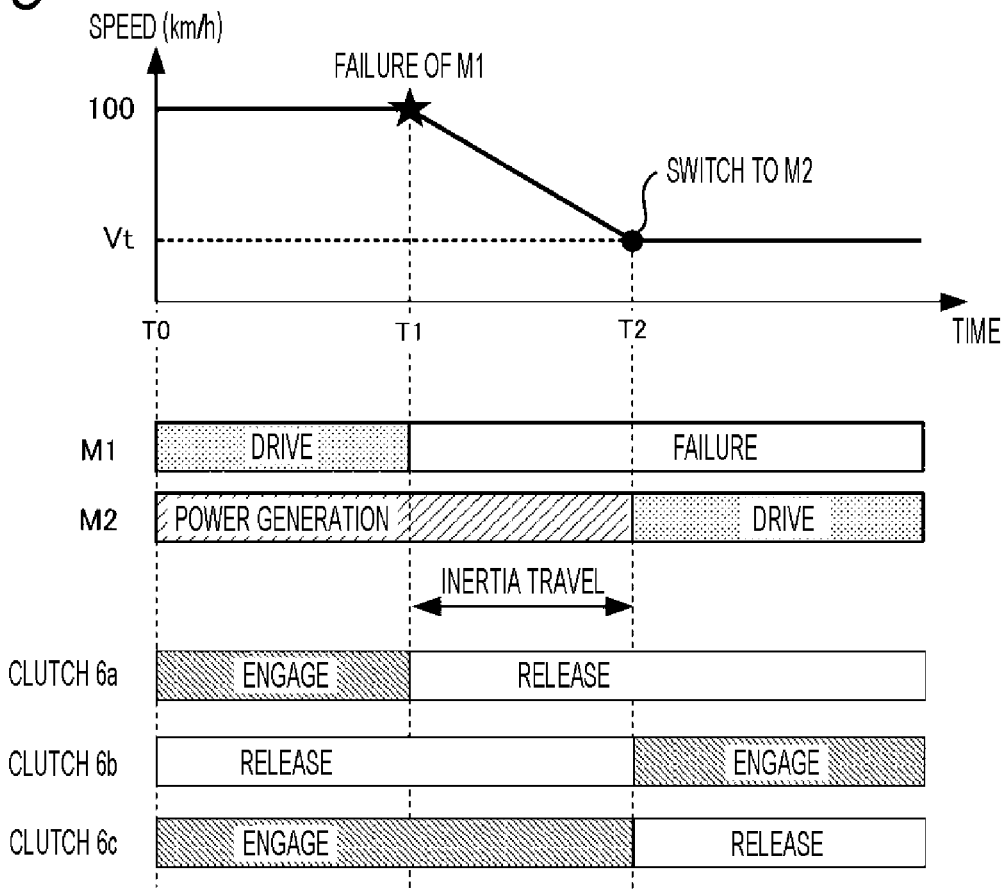
FIG. 3 is a diagram illustrating Example 1 of the present invention and illustrating a vehicle speed and a state of an electric motor of a hybrid drive system.

FIG. 3 is a diagram illustrating a profile of drive states and vehicle speeds of the electric motors M1 and M2 when the electric motor M1 fails in the hybrid drive system including the monitoring device 8 to which the present invention is applied. While the vehicle is traveling at 100 km/h, the vehicle travels by the driving force of the electric motor M1 until time T1, and the electric motor M2 is in a power generation state.

When the electric motor M1 fails at time T1, the monitoring device 8 detects the failure and disconnects the electric motor M1 from the wheel 3 by releasing the clutch 6a. The vehicle travels by means of inertia after time T1, and gradually decelerates due to travel resistance.

Then, at time T2 when the vehicle speed decreases to a predetermined vehicle speed Vt, the monitoring device 8 engages the clutch 6b and connects the electric motor M2 to the wheel 3. At time T2, the monitoring device 8 releases the clutch 6c to disconnect the engine 5 from the electric motor M2. As a result, the driving force of the electric motor M2 can be controlled by the controller MC2 via the inverter IN2. The operation of the engine 5 may be continued.

When the vehicle speed is equal to or less than the constant vehicle speed Vt, the driving force of the electric motor M2 is obtained, so that the vehicle can travel at a low speed after time T2. By the function of the monitoring device 8, the vehicle can be decelerated and retracted to a safe place while securing safety by executing an appropriate brake operation without rapidly decelerating the vehicle. The brake operation can be performed by an automatic driving control unit (not illustrated).

Although FIG. 3 illustrates an example in which the clutch 6c is released at time T2 when the driving by the electric motor M2 is started, and the engine 5 is disconnected from the electric motor M2, the present invention is not limited thereto. For example, the clutch 6c may be released in a period before time T2 at which the clutch 6b is engaged after time T1 at which the failure of the electric motor M1 is detected. When the monitoring device 8 releases the clutch 6c at time T2, the battery BT can be charged during the inertia traveling.

Figure 4:
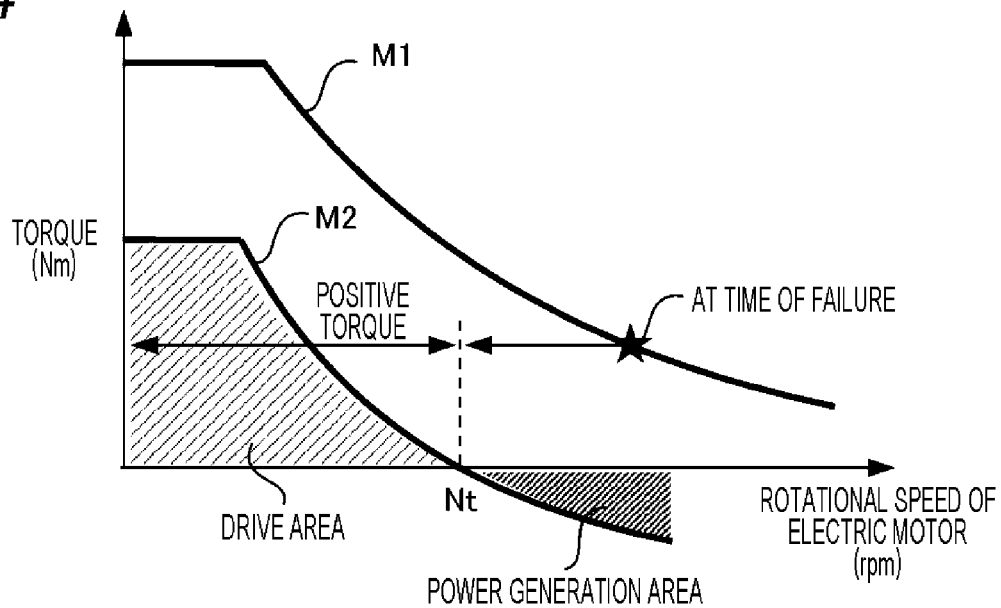
FIG. 4 is a graph illustrating Example 1 of the present invention and illustrating a relationship between a rotational speed of an electric motor and a torque.

The reason why rapid braking is applied when the clutch 6b is engaged to switch to the electric motor M2 while the vehicle is traveling at a high speed will be described. FIG. 4 is a graph illustrating a relationship between the rotational speeds of the electric motor M1 and the electric motor M2 and a maximum torque.

The torque of the electric motor M1 has a characteristic that the torque decreases as the rotational speed increases. This is because when the electric motor M1 rotates at a high rotational speed, a counter electromotive force increases, and a drive current for traveling cannot flow.

The maximum torque of the electric motor M2 is lower than that of the electric motor M1 because a low-output electric motor is used. The range in which the drive torque (positive torque) for causing the vehicle to travel by the electric motor M2 is obtained is up to a rotational speed Nt, and when the rotational speed reaches Nt or more due to an external force, it becomes a power generation region, and a deceleration torque (negative torque) is generated.

Therefore, when switching to the electric motor M2 is performed when the vehicle is traveling at a high speed at the time of a failure of the electric motor M1, if the rotational speed of the electric motor M2 exceeds Nt, the electric motor M2 becomes a power generation region and a deceleration torque is generated. The higher the vehicle speed, the more rapid the deceleration.

In order to avoid the rapid deceleration, in the present invention, the second drive device 2 including the electric motor M1 (first electric motor) that causes the vehicle to travel and the electric motor M2 (second electric motor) having a smaller output than the electric motor M1 includes the monitoring device 8 that monitors the state of the vehicle, and the monitoring device 8 detects the failure of the electric motor M1 and switches to the vehicle travel by the electric motor M2 when the vehicle speed becomes equal to or less than the vehicle speed Vt at which the positive torque is obtained from the electric motor M2.

Note that, in a case where the vehicle speed is low (equal to or less than Vt) and the rotational speed of the electric motor M2 when switching to the electric motor M2 is equal to or less than Nt, switching to the electric motor M2 can be performed at the time point when the electric motor M1 fails.

As a result, it is possible to perform a safe fail operation even when the low cost electric motor M2 having a small output or the small clutch 6b is used, and it is possible to achieve both miniaturization, cost reduction, and redundancy of the hybrid drive system.

Figure 5:
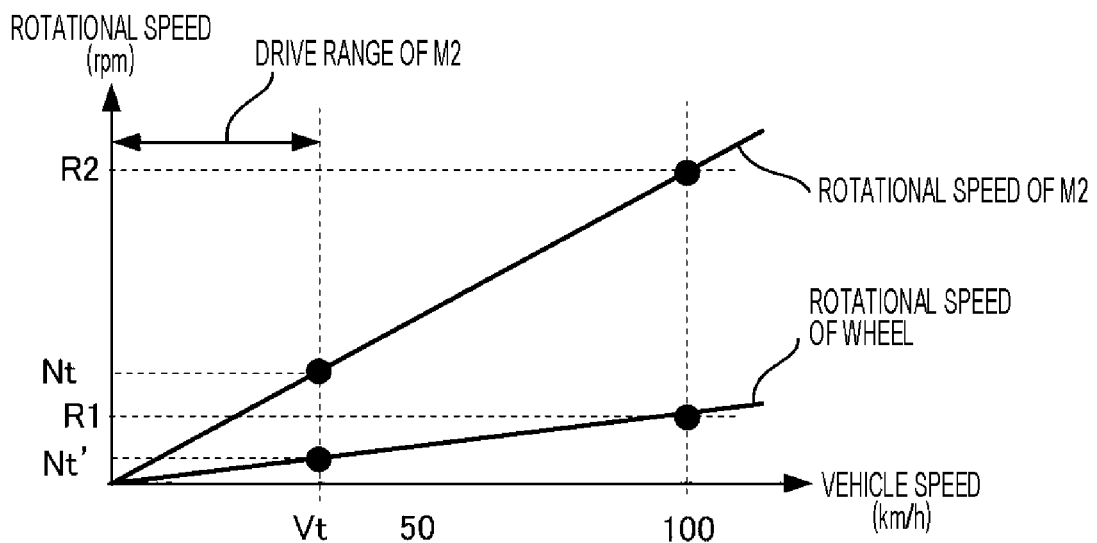
FIG. 5 is a graph illustrating Example 1 of the present invention and illustrating a relationship among a vehicle speed, a rotational speed of a wheel, and a rotational speed of an electric motor.

Whether the electric motor M2 is in the positive torque range at the time of a failure of the electric motor M1 can be calculated from the vehicle speed and the rotational speed of the wheel. FIG. 5 is a graph illustrating an example of a relationship among the vehicle speed, the rotational speed of the wheel, and the rotational speed of the electric motor M2.

The relationship among these can be calculated from a diameter of the wheel and a reduction ratio between the electric motor M2 and the wheel. The rotational speed of the wheel at the rotational speed Nt for obtaining the positive torque by the electric motor M2 is Nt', and the vehicle speed is Vt.

In order to determine the switching of a drive source when the electric motor M1 fails, the rotational speed of the wheel and the vehicle speed can be used, but the present invention is not limited to any of these values. In addition, since a power generation capacity and a driving capability of the electric motor M2 are appropriately designed depending on the engine, the vehicle weight, or the like, the range (Nt) in which the positive torque of the electric motor M2 is obtained is not uniformly determined.

Figure 6:
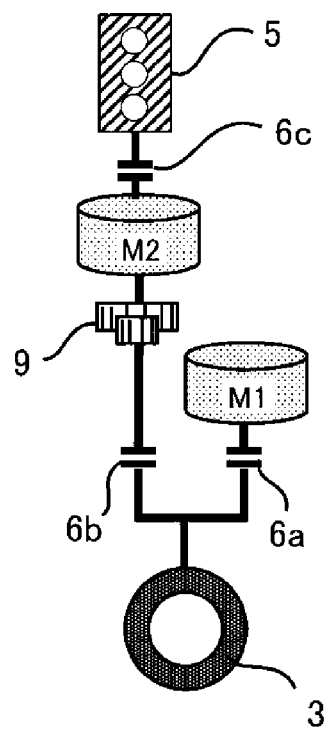
FIG. 6 is a diagram illustrating a modification of Example 1 of the present invention and illustrating a relationship between an electric motor and a clutch.

FIG. 6 is a diagram illustrating a modification of Example 1 and illustrating a relationship between an electric motor and a clutch. In the modification, a hybrid drive system in which a range in which a positive torque can be obtained in traveling by the electric motor M2 can be adjusted will be described. FIG. 6 is a diagram obtained by extracting a portion that transmits the driving force of the electric motor M1 and the electric motor M2 in FIG. 1 to the wheel 3. The difference from FIG. 1 is that a rotation speed converter 9 is provided between the electric motor M2 and the clutch 6b.

As the rotation speed converter 9, a combination of a pair of rotation gears, a belt, a pulley, or the like can be used. The rotation speed converter 9 increases the rotational speed of the electric motor M2 to drive the wheel 3. Note that the rotation speed converter 9 may be disposed between the electric motor M2 and the wheel 3, and may be disposed, for example, between the clutch 6b and the wheel 3. The driving force may be transmitted between the clutch 6b and the wheel 3 by a gear. Effects obtained by providing the rotation speed converter 9 will be described below.

Figure 7:
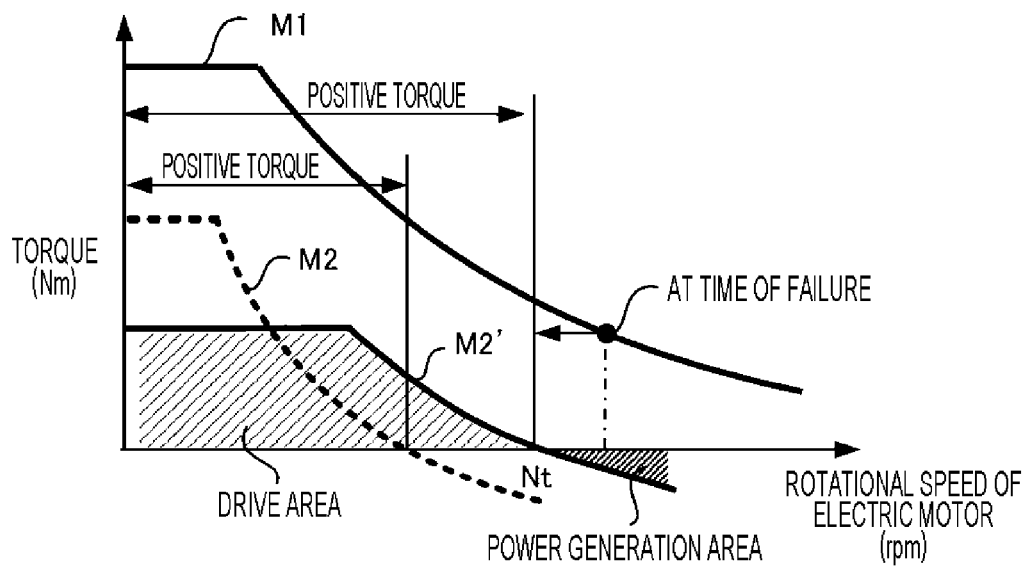
FIG. 7 is a graph illustrating a modification of Example 1 of the present invention and illustrating a relationship between a rotational speed of an electric motor and a torque.

FIG. 7 is a graph of the torque and the rotational speed output from the electric motor M2 via the rotation speed converter 9. A transmission ratio of the rotation speed converter 9 is different between characteristics of the electric motor M2 in the drawing and an electric motor M2' indicated by a solid line in the drawing. For example, the characteristic of the electric motor M2' is set such that the transmission ratio is smaller than the characteristic of the electric motor M2. In the present example, the transmission ratio is defined as an input-shaft rotational speed/an output-side rotational speed of the rotation speed converter 9.

Since the rotational speed on the output side of the rotation speed converter 9 is increased by decreasing the transmission ratio (less than 1), it is possible to generate a positive torque up to a higher rotational speed. On the other hand, by setting the transmission ratio to be small, the maximum torque that can be output from the rotation speed converter 9 decreases. If the positive torque can be generated up to the high rotation range, a traveling range of the electric motor M2 can be expanded, and the vehicle can be retracted more safely while suppressing a decrease in the vehicle speed during high-speed traveling or climbing. How much the transmission ratio is set can be appropriately designed by a weight of the vehicle and a maximum output of the electric motor M2.

Although an example in which the electric motor M1 has failed has been described in the present example, the control of the monitoring device 8 can be applied even in a case where any one of the electric motor M1 included in the first drive device, the inverter IN1, or the controller MC1 has failed.

As described above, in the hybrid drive system of the present example, when the traveling electric motor M1 fails, it is possible to realize a low-cost redundant configuration by using the electric motor M2 as a generator as the power source.

Then, it is possible to provide a hybrid drive system that secures safety by adopting the electric motor M2 having a maximum torque smaller than that of the electric motor M1 and gradually decelerating the vehicle speed by inertia traveling until a driving state of the vehicle in a case where the electric motor M1 fails reaches a predetermined condition (vehicle speed is equal to or less than Vt) in which a driving force (positive torque) can be generated by the electric motor M2.

Further, in the present example, an example in which the engine 5 is used as a power source in a case where the electric motor M2 is used as a generator has been described, but the invention is not limited thereto. As the power source of the electric motor M2, an external combustion engine can be used in addition to an internal combustion engine.

Example 2

Figure 8:
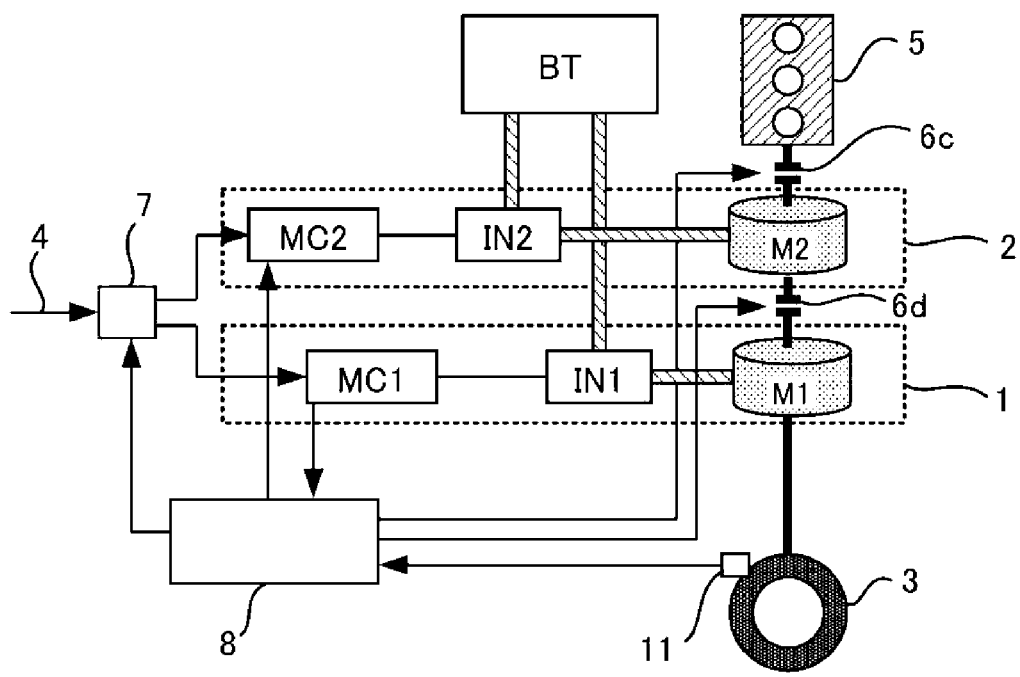
FIG. 8 is a diagram illustrating Example 2 of the present invention and an example of a hybrid drive system.

FIG. 8 is a block diagram illustrating Example 2 of the present invention and an example of a hybrid drive system. In Example 2, the clutch 6d is disposed between the electric motor M2 and the electric motor M1, and when the electric motor M1 fails, the clutch 6d is engaged to connect the electric motor M1 to the electric motor M2.

The failed electric motor M1 is co-rotated by the driving force of the electric motor M2, but the driving force is applied to the wheel 3 to cause the vehicle to travel. The engine 5 is disconnected from the electric motor M2 by the clutch 6c. The torque command 4 switches a destination of the torque command 4 from the controller MC1 to the controller MC2 by a signal switch 7.

The clutches 6c and 6d and the signal switch 7 are controlled by a command from the monitoring device 8. The clutch 6c is intended to disconnect the engine 5 and the electric motor M2 in order to reduce the torque loss caused by the engine 5. The present Example 2 can be applied to a case where necessary driving force can be secured even if the failed electric motor M1 is coupled, and the number of clutches can be reduced to achieve a lower cost configuration.

Figure 9:
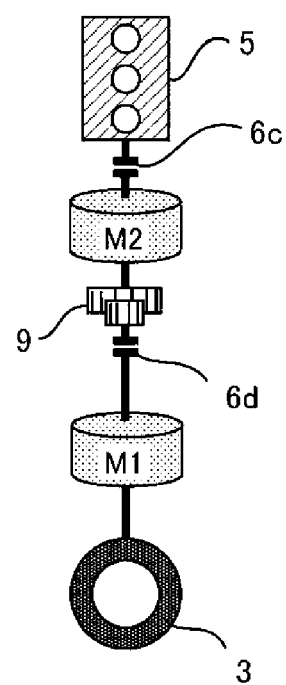
FIG. 9 is a diagram illustrating a modification of Example 2 of the present invention and illustrating a relationship between an electric motor and a clutch.

Also in the configuration illustrated in FIG. 8, a range in which the driving force (positive torque) of the vehicle can be obtained by the electric motor M2 can be adjusted. FIG. 9 is a diagram illustrating a modification of the present Example 2 and illustrating a relationship between an electric motor and a clutch.

FIG. 9 illustrates an example in which the rotation speed converter 9 is provided between the electric motor M2 and the clutch 6d in a portion for transmitting the driving force of the electric motor M1 and the electric motor M2 illustrated in FIG. 8 to the wheel. As the rotation speed converter 9, a combination of a pair of rotation gears, a belt, or a pulley can be used.

Similarly to the configuration illustrated in FIG. 7 of Example 1, also in the present Example 2, by setting the transmission ratio to be small (less than 1), the rotational speed on the output side of the rotation speed converter 9 can be increased to generate a positive torque up to a higher rotation, and a vehicle speed range in which the vehicle can travel can be expanded by the driving force of the electric motor M2.

Although an example in which the electric motor M1 has failed has been described in the present example, control of the monitoring device 8 can be applied even in a case where any one of the electric motor M1 included in the first drive device 1, the inverter IN1, or the controller MC1 has failed.

As described above, similarly to Example 1, the hybrid drive system of Example 2 can realize a low-cost redundant configuration by using the electric motor M2 as a generator as the power source when the traveling electric motor M1 fails.

Then, it is possible to provide a hybrid drive system that secures safety by adopting the electric motor M2 having a maximum torque smaller than that of the electric motor M1 and gradually decelerating the vehicle speed by inertia traveling until a driving state of the vehicle in a case where the electric motor M1 fails reaches a predetermined condition (vehicle speed is equal to or less than Vt) in which a driving force (positive torque) can be generated by the electric motor M2.

CONCLUSION

As described above, the vehicle control system of the above examples can have the following configuration.

(1) A vehicle control system including a first electric motor (M1) that causes a vehicle to travel, a second electric motor (M2) that generates power by using an output of a power source (engine 5) and starts the power source (5), a power storage device (battery BT) that stores the power generated by the second electric motor (M2) and supplies the power to the first electric motor (M1), a monitoring device (8) that monitors a failure state of the vehicle, and a switching device (clutches 6a to 6c) that switches a driving force for causing the vehicle to travel from the first electric motor (M1) to the second electric motor (M2), in which, in a case of a predetermined driving state in which the monitoring device (8) detects a failure of the first electric motor (M1) and a driving force is obtained from the second electric motor (M2), the monitoring device (8) controls the switching device (clutches 6a to 6c) to switch the driving force for causing the vehicle to travel from the first electric motor (M1) to the second electric motor (M2).

With the above configuration, when the traveling electric motor M1 fails, it is possible to realize a low-cost redundant configuration by using the electric motor M2 as a generator as the power source. Then, it is possible to provide a hybrid drive system that secures safety by adopting the electric motor M2 having a maximum torque smaller than that of the electric motor M1 and gradually decelerating the electric motor M2 by inertia traveling until a driving state of the vehicle in a case where the electric motor M1 fails reaches a predetermined condition (vehicle speed is equal to or less than Vt) in which a driving force (positive torque) can be generated by the electric motor M2.

(2) The vehicle control system according to (1), further including a vehicle speed sensor (11) that detects a vehicle speed, in which, in a case where the vehicle speed obtained from the vehicle speed sensor (11) becomes equal to or less than a predetermined value (Vt), the monitoring device (8) determines that the predetermined driving state is reached, and switches to the driving force from the second electric motor (M2) to cause the vehicle to travel.

With the above configuration, as the predetermined condition under which the driving force can be generated by the electric motor M2, it is possible to provide a hybrid drive system in which safety is secured by gradually decelerating the vehicle speed by inertia traveling until the vehicle speed becomes equal to or less than the predetermined value Vt.

(3) The vehicle control system according to (1), in which the first electric motor (M1) is coupled to a first controller (MC1) that controls a current to control a rotational speed, the second electric motor (M2) is coupled to a second controller (MC2) that controls a current to control a rotational speed, and the first controller (MC1) and the second controller (MC2) are separated into different circuits.

With the above configuration, by separately disposing the circuits of the controllers MC1 and MC2 and the inverters IN1 and IN2, redundancy against a failure or the like can be secured.

(4) The vehicle control system according to (1), in which the switching device (6a to 6c) includes a first clutch (6a) disposed between the first electric motor (M1) and a wheel (3), and second clutch (6b) disposed between the second electric motor (M2) and the wheel (3), and the monitoring device (8) releases the first clutch (6a) when the failure of the first electric motor is detected, and engages the second clutch (6b) when the predetermined driving state is reached.

With the above configuration, when the monitoring device 8 detects a failure of the electric motor M1, the monitoring device 8 releases the clutch 6a to disconnect the electric motor M1 from the wheel 3, and then couples the electric motor M2 to the wheel 3, so that it is possible to safely switch the power source while preventing the occurrence of sudden deceleration or the like.

(5) The vehicle control system according to (4), in which the switching device (6a to 6c) further includes a third clutch (6c) disposed between the second electric motor (M2) and the power source (5), and the monitoring device (8) releases the third clutch (6c) after detecting the failure of the first electric motor (M1).

With the above configuration, the monitoring device (8) can separate the engine 5 from the electric motor M2 by releasing the clutch 6c after detecting the failure of the first electric motor (M1), and can prevent a loss of the driving force generated by the electric motor M2.

(6) The vehicle control system according to (1), further including a rotation speed converter that converts a rotational speed, between the second electric motor (M2) and the wheel (3).

With the above configuration, by decreasing the transmission ratio of the rotation speed converter 9 (less than 1), the rotational speed on the output side of the rotation speed converter 9 increases, so that a positive torque can be generated up to a higher rotation. It is possible to retract a vehicle more safely while suppressing a decrease in a vehicle speed during high-speed traveling.

Note that the present invention is not limited to the above-described examples, and includes various modifications. For example, the above-described examples have been described in detail in order to describe the present invention in an easy-to-understand manner, and are not necessarily limited to those having all the described configurations. In addition, a part of the configuration of a certain example can be replaced with the configuration of another example, and the configuration of another example can be added to the configuration of a certain example. In addition, for a part of the configuration of each example, any addition, deletion, or substitution of other configurations can be applied alone or in combination.

In addition, some or all of the above-described configurations, functions, processing units, processing means, and the like may be realized by hardware, for example, by designing with an integrated circuit. In addition, each of the above-described configurations, functions, and the like may be realized by software by a processor interpreting and executing a program for realizing each function. Information such as a program, a table, and a file for realizing each function can be stored in a recording device such as a memory, a hard disk, and a solid state drive (SSD), or a recording medium such as an IC card, an SD card, and a DVD.

In addition, the control lines and the information lines indicate what is considered to be necessary for the description, and do not necessarily indicate all the control lines and the information lines on the product. In practice, it may be considered that almost all the configurations are coupled to each other.

REFERENCE SIGNS LIST

M1 electric motor
M2 electric motor
IN1 inverter
IN2 inverter
MC1 controller
MC2 controller
1 first drive device
2 second drive device
3 wheel
5 engine
6a to 6d clutch
7 signal switch
8 monitoring device
9 rotation speed converter
11 vehicle speed sensor

The invention claimed is:

1. A vehicle control system comprising:
a first electric motor that causes a vehicle to travel;
a second electric motor that generates power by using an output of a power source and starts the power source;
a power storage device that stores the power generated by the second electric motor and supplies the power to the first electric motor;
a monitoring device that monitors a failure state of the vehicle, the monitoring device comprising a processor and a memory;
a switching device in communication with the processor that switches a driving force for causing the vehicle to travel from the first electric motor to the second electric motor; and
a vehicle speed sensor that detects a vehicle speed, wherein
in a case of a predetermined driving state being reached in which the monitoring device detects a failure of the first electric motor and a driving force is obtained from the second electric motor, the monitoring device controls the switching device to switch the driving force from the first electric motor to the second electric motor in order to cause the vehicle to travel; and
wherein in a case where the vehicle speed obtained from the vehicle speed sensor becomes equal to or less than a predetermined value when the vehicle decelerates due to travel resistance after failure of the first electric motor, the monitoring device determines that the predetermined driving state is reached, and switches to the driving force from the second electric motor to cause the vehicle to travel.

2. The vehicle control system according to claim 1, wherein
the first electric motor is coupled to a first controller that controls a current to control a rotational speed of the first electric motor,
the second electric motor is coupled to a second controller that controls a current to control a rotational speed of the second electric motor, and
the first controller and the second controller are separated into different circuits.

3. The vehicle control system according to claim 1, wherein the switching device includes
a first clutch disposed between the first electric motor and a wheel, and
a second clutch disposed between the second electric motor and the wheel, and
the monitoring device releases the first clutch when the failure of the first electric motor is detected, and engages the second clutch when the predetermined driving state is reached.

4. The vehicle control system according to claim 3, wherein
the switching device further includes a third clutch disposed between the second electric motor and the power source, and
the monitoring device releases the third clutch after detecting the failure of the first electric motor.

5. The vehicle control system according to claim 1, further comprising:
a rotation speed converter including a pair of rotation gears, a belt, or a pulley, wherein the rotation speed converter converts a rotational speed, between the second electric motor and a wheel.

* * * * *